United States Patent
Rothmund et al.

(10) Patent No.: US 12,515,686 B2
(45) Date of Patent: Jan. 6, 2026

(54) METHOD FOR PREVENTING AN UNINTENTIONAL START OF A WORK-PERFORMING MACHINE

(71) Applicant: ZF Friedrichshafen AG, Friedrichshafen (DE)

(72) Inventors: Andreas Rothmund, Hohentengen (DE); Matthias Madlener, Hohentengen (DE); Andreas Moosmüller, Passau (DE); Guilherme Ariello, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 148 days.

(21) Appl. No.: 18/493,896

(22) Filed: Oct. 25, 2023

(65) Prior Publication Data

US 2024/0140461 A1  May 2, 2024

(30) Foreign Application Priority Data

Oct. 27, 2022 (DE) .......................... 102022211391.8

(51) Int. Cl.
*B60W 50/12* (2012.01)
*B60W 40/09* (2012.01)
*B60W 50/10* (2012.01)

(52) U.S. Cl.
CPC ............ *B60W 50/12* (2013.01); *B60W 40/09* (2013.01); *B60W 50/10* (2013.01)

(58) Field of Classification Search
CPC ....... B60W 50/12; B60W 40/09; B60W 50/10
See application file for complete search history.

(56) References Cited

U.S. PATENT DOCUMENTS

| 10,005,363 B1* | 6/2018 | Correia | B60L 3/12 |
| 2009/0069978 A1* | 3/2009 | Inage | B60T 8/885 |
| | | | 701/41 |

(Continued)

FOREIGN PATENT DOCUMENTS

DE  102008003661 A1  7/2009

OTHER PUBLICATIONS

Loske, 3-Level Safety Concept for Automotive-Compatible Rapid Control Prototyping Platform, Elektroniknet.de, Aug. 2015, pp. 1-13, Elektroniknet.de, https://www.elektroniknet.de/automotive/elektromobilitaet/sicherheit-hoch-drei_122218/seite-2.html retrieved from the internet on May 6, 2024.

*Primary Examiner* — Mohamad O El Sayah
(74) *Attorney, Agent, or Firm* — LEYDIG, VOIT & MAYER, LTD.

(57) ABSTRACT

A method for preventing an unintentional start of a work-performing machine, wherein the work-performing machine includes an electric machine for propelling the work-performing machine, the method including checking whether there is a driving request from a driver of the work-performing machine and detecting information relating to an operating mode of the electric machine. The method further includes determining, based on the checking in relation to the driving request and the detected operating mode of the electric machine, whether the electric machine is in a safety-critical state and, if it is determined that the electric machine is in the safety-critical state, sending a signal to the electric machine to transition the electric machine to a state not suitable for propulsion.

12 Claims, 2 Drawing Sheets

(56) References Cited

U.S. PATENT DOCUMENTS

| | | | |
|---|---|---|---|
| 2015/0025765 A1* | 1/2015 | Oppelland | G08G 1/052 |
| | | | 701/70 |
| 2018/0274510 A1* | 9/2018 | Pedlar | B60W 30/18018 |
| 2019/0135273 A1* | 5/2019 | Safstrom | G01P 3/481 |
| 2021/0309240 A1* | 10/2021 | Kim | B60W 50/10 |
| 2022/0297691 A1* | 9/2022 | Knueven | B60L 7/18 |
| 2023/0060130 A1* | 3/2023 | Sannodo | G05D 1/0011 |
| 2024/0166178 A1* | 5/2024 | Kikawa | B60T 13/588 |

* cited by examiner

METHOD FOR PREVENTING AN UNINTENTIONAL START OF A WORK-PERFORMING MACHINE

CROSS REFERENCE TO RELATED APPLICATIONS

This application claims benefit to German Patent Application No. DE 10 2022 211 391.8, filed on Oct. 27, 2022, which is hereby incorporated by reference herein.

FIELD

The present invention relates to a method for preventing an unintentional start of a work-performing machine. Furthermore, the present invention relates to a control device which is configured to execute such a method. Further, the present invention relates to a drive assembly comprising such a control device and to a work-performing machine comprising such a drive assembly.

BACKGROUND

Methods for controlling the driving behavior of vehicles are known from the prior art. Driving behavior can be actively induced, for example via active braking. Alternatively, driving behavior can be prevented, for example via a lane change.

SUMMARY

In an embodiment, the present disclosure provides a method for preventing an unintentional start of a work-performing machine, wherein the work-performing machine comprises an electric machine for propelling the work-performing machine, the method comprising checking whether there is a driving request from a driver of the work-performing machine and detecting information relating to an operating mode of the electric machine. The method further comprises determining, based on the checking in relation to the driving request and the detected operating mode of the electric machine, whether the electric machine is in a safety-critical state and, if it is determined that the electric machine is in the safety-critical state, sending a signal to the electric machine to transition the electric machine to a state not suitable for propulsion.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
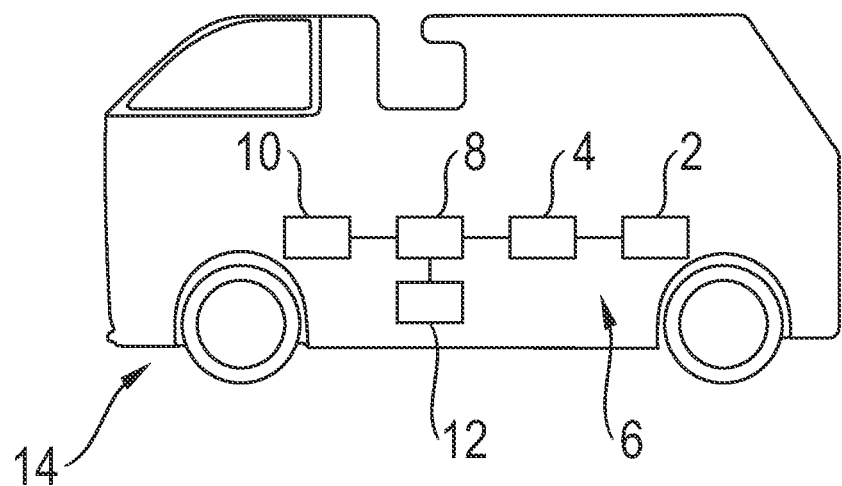
FIG. 1. shows a schematic view of a work-performing machine, a control device, and a drive assembly according to an embodiment.

In a first aspect, the present invention relates to a method for preventing an unintentional start of a work-performing machine. The work-performing machine may be an agricultural machine, a construction machine, a transportation machine, or an off-highway vehicle. The work-performing machine comprises an electric machine for propelling the work-performing machine. The electric machine can be supplied with electrical energy from an energy storage device, for example a battery, such as a lithium-ion battery, to propel the work-performing machine. In addition to the electric machine for propulsion, the work-performing machine can comprise other machines, such as other electric machines, for example for lifting a lifting gear. Further, the work-performing machine may comprise a control device, which may be configured to execute the method for preventing the work-performing machine from starting unintentionally. The electric machine may comprise an inverter, for example a low-voltage inverter. The unintentional start of the work-performing machine may be a start of the work-performing machine that a driver of the work-performing machine did not want. Preventing the unintentional start of the work-performing machine may include preventing or inhibiting a further start.

The method comprises checking whether there is a driving request from a driver of the work-performing machine. The check may comprise detecting a driver request of the driver of the work-performing machine. The check may comprise detecting information relating to the driving request of the driver, for example information relating to a position of at least one pedal of the work-performing machine. The driving request can be determined in dependence on information relating to the position of at least one pedal. A desired travel speed of the work-performing machine can be determined in dependence on information relating to the position of at least one pedal. Only the amount, and not the sign, of this travel speed can be determined.

Furthermore, information about an operating mode of the electric machine is detected. Here, the detection can include receiving information relating to the operating mode from the inverter and alternatively or additionally from the electric machine. The operating mode may comprise information relating to a torque provided by the electric machine for propelling the work-performing machine. For example, the operating mode may be one of a generator mode, a motor mode, and a torque-free mode. In generator mode, the electric machine can be operable as a generator, and negative torque may be present, with torque being transmitted to the electric machine via a drive train, for example. In motor mode, a positive torque may be present, and the electric machine can be configured to provide torque to propel the work-performing machine in motor mode. In torque-free mode, torque transmitted from or to the electric machine may be less than one or more threshold torques.

The method further comprises determining, based on the check in relation to the driving request and the detected operating torque of the electric machine, whether the electric machine is in a safety-critical state. For example, the electric machine is in a safety-critical state if the check indicates that a driving request from the driver is not present, and thus the driver is not pressing a pedal, and, at the same time, the detected operating mode indicates that the electric machine is being used to propel the work-performing machine. Thus, a start by propulsion of the work-performing machine by the electric machine, determinable by the detected operating mode, may be present, although this may not be intentional, since the necessary driving request of a driver, i.e., the pressing of a pedal, is not present.

Further, if it is determined that a safety critical state exists, the method comprises sending a signal to the electric machine to transition the electric machine to a state not suitable for propulsion. The control device for executing the method can be electronically connected to the electric machine and to the inverter. Thus, the signal for transferring the electric machine to the state not suitable for propulsion can be sent to the inverter and the electric machine. This may involve sending a safety state request from the control device executing the method to the electric machine or the inverter. Here, the state not suitable for propulsion can be a safe state of the electric machine. In the state not suitable for propulsion, it can be provided that the electric machine cannot apply any drive force for propulsion of the work-performing machine.

The disclosed method can thus be used to safeguard against and prevent an unintentional start of the work-performing machine. An unintentional start of the work-performing machine can be safety-critical, for example, since persons may be present in the vicinity of the work-performing machine. Such a method can prevent hardware or software errors that can trigger such an unintentional start of the work-performing machine.

According to an embodiment, the method can be characterized in that the safety-critical state is determined when the electric machine is in a motor mode. The safety-critical state can be determined when the operating mode of the electric machine changes to motor mode. For example, the operating mode may change from torque-free mode to motor mode. For this purpose, the information relating to the operating mode of the electric machine can be detected at at least two different times, so that a change of the operating mode of the electric machine can be determined in dependence on a time.

Thus, the method can ensure that an active start, and no rolling, of the work-performing machine can be detected. Thus, the method can be limited to driving situations in which the work-performing machine is actively propelled by the electric machine and does not merely roll without being actively driven, for example due to a slope drive force.

According to an embodiment, the method can be characterized in that a state variable of the work-performing machine correlating with an actual movement of the work-performing machine is detected. The actual movement of the work-performing machine can be defined here in a longitudinal direction of the work-performing machine. Further, detection of the state variable can comprise a determination of the actual movement of the work-performing machine based on the detected state variable. For example, a rotational speed of a wheel or a chain of the work-performing machine may be detected as a state variable. A predetermined transmission ratio can be used to determine the actual movement of the work-performing machine in dependence on the detected rotational speed of the wheel or chain. Furthermore, the method can be characterized in that a safety-critical state is determined when the determined actual movement changes from a standstill of the work-performing machine to a locomotion of the work-performing machine.

In this way, the method can ensure that a safety-critical state is determined only when the work-performing machine is actually moving and the actual movement of the work-performing machine is not equal to a standstill. For example, it can be ruled out that although the electric machine is in the motor mode, and thus potentially the electric machine can be used to propel the work-performing machine, a coupling between the electric machine and a driven wheel is open. Thus, the method can be used to prevent an unintentional start, wherein situations in which the work-performing machine is at a standstill cannot lead to a safety-critical state.

According to an embodiment, the method can be characterized in that the detection of the state variable of the work-performing machine correlating with the actual movement of the work-performing machine comprises a detection of a motor speed of the electric machine. The detection of the motor speed of the electric machine can comprise receiving a signal comprising information relating to the motor speed of the electric machine from the inverter and alternatively or additionally from the electric machine. The motor speed can be detected by means of sensors on the electric machine. Alternatively or additionally, current and voltage measurements can be used to determine the motor speed. The determination of the actual movement can be based on the detected motor speed. Further, in the determination of the actual movement of the work-performing machine, a standstill of the work-performing machine can be determined if the detected motor speed is within a parameter range around a motor speed corresponding to a standstill of the work-performing machine. The parameter range can have positive as well as negative motor speeds, wherein, for example, the parameter range is symmetrically arranged around the motor speed of zero. If the detected motor speed is outside the parameter range, it can be determined that the actual movement of the work-performing machine does not correspond to a standstill of the work-performing machine and that the work-performing machine is moving.

Thus, a standstill of the work-performing machine can be defined, and the function and method for preventing an unintentional start of the work-performing machine can then determine a safety-critical state depending on the standstill thus defined. Outside the parameter range, the motor speed may correspond to a travel speed that is greater than a minimum speed. The safety-critical state can be determined if the work-performing machine previously moves at a slow speed, which is slower than a corresponding motor speed within the parameter range, and then moves at a motor speed corresponding outside the parameter range. In this case, there may be a change from a standstill of the work-performing machine to a locomotion of the work-performing machine. Thus, an unintentional start can also be monitored.

According to an embodiment, the method can further be characterized in that a gradient of the detected motor speed can be determined. In this case, the control device can be configured to carry out the determination of the gradient of the motor speed. Furthermore, the method can be characterized in that a safety-critical state is determined if the determined gradient of the detected motor speed is greater than a minimum gradient. The minimum gradient can be a predetermined minimum gradient and can be stored on the control device. The minimum gradient can be parameterizable when coding the control device. The minimum gradient can be compared with the determined gradient. This can be done as part of the determination of the safety critical state or just prior thereto. Here, if the safety-critical state is determined in dependence on the determined gradient, it is not necessary to monitor a change of the actual movement of the work-performing machine according to an embodiment.

By determining the gradient and by determining whether a safety-critical state is present in dependence on the determined gradient, the method can be made more robust. For example, by not determining the safety-critical state when the determined gradient is smaller than the minimum gradient, creeping behavior of the work-performing machine can be excluded. In such a creeping behavior, the travel speed of the work-performing machine may change only slightly over time.

According to an embodiment, the method can be characterized in that the determination of a safety-critical state comprises a determination of whether the safety-critical state is present for the duration of a fault tolerance time. Thus, it can be determined that the safety-critical state present if it exists for at least the fault tolerance time. For example, the fault tolerance time can be several milliseconds, several hundredths or tenths of seconds, or a few seconds. The error tolerance time can be parameterizable and alternatively or additionally encodable on the control device that can execute the method. For example, a safety-critical state can be determined if the operating mode of the electric machine is in motor mode for the duration of the fault tolerance time and there is no driving request from the driver.

Thus, with the fault tolerance time, the method can be made more robust, since, if the preconditions for determining a safety-critical state are only present for a time shorter than the fault tolerance time, it is determined that no safety-critical state is present. Thus, it is not necessary to transfer the electric machine to a state not suitable for propulsion in such a case.

According to an embodiment, the method can be characterized in that a driver's travel direction request can be detected. In this case, information relating to a position of a travel direction switch can be detected and sent to the control device executing the method. The detection of the travel direction request can comprise receiving information relating to the position of the travel direction switch. Detecting the travel direction request can comprise a determination of the travel direction request in dependence on the received information relating to the position of the travel direction switch. For example, the travel direction request can be forward, reverse, or neutral. Further, the method can be characterized in that the error tolerance time can be determined in dependence on the detected travel direction request. For example, a longer error tolerance time can be determined if the travel direction request is forward or reverse. For example, a shorter error tolerance time can be determined if the travel direction request is neutral.

By making the error tolerance time dependent on the driver's travel direction request, and thus on the position of the travel direction switch, the error tolerance time can be determined in response to a driving command from the driver. Thus, if the travel direction switch is in a forward or reverse position, the error tolerance time may be longer. In such a situation, it can be assumed that the driver wants to start. Thus, the error tolerance time can be longer than when the travel direction switch is in a neutral position and it can be assumed that the driver does not want to start, i.e., it can be desired that the safety-critical state is detected earlier.

Furthermore, the method according to an embodiment can be characterized in that a determination can be made as to whether a non-propulsion state is present. In the non-propulsion state, no propulsion of the work-performing machine can take place. Alternatively or additionally, the work-performing machine can be at a standstill in the non-propulsion state. Alternatively or additionally, there may be no driving request from the driver of the work-performing machine in the non-propulsion state. Furthermore, the method can be characterized in that the safety-critical state is determined when it has been determined, for example when it has been determined beforehand, that a non-propulsion state is present.

Thus, the method can be made more robust in that a safety-critical state can be determined only in those situations in which such a non-propulsion state is detected, for example has already been detected beforehand. Further preconditions, as described in the previous embodiments, can then be checked, and if these are present, a safety-critical state can be determined, provided that this non-propulsion state was previously present. Thus, the function implemented by the method can only be switched active, i.e., monitoring can only be started, if this non-propulsion state is also present.

According to an embodiment, the method can be characterized in that the determination of a safety-critical state comprises determining whether the non-propulsion state exists for at least a debounce time. The safety-critical state can be determined when the non-propulsion state is present for at least the debounce time. The debounce time can be several milliseconds, hundredths or tenths of a second, or a few seconds. Debounce time and fault tolerance time may both be provided when executing the method.

By providing such a debounce time, the method can be made more robust. Thus, the non-propulsion state must be present for at least the debounce time, so that the monitoring, implemented by the method, is switched active. During this debounce time, the monitoring can still be inactive. Even before the debounce time, the monitoring, i.e., if necessary the transmission of the signal for transferring the electrical machine into a state not suitable for propulsion, can still be switched inactive.

According to an embodiment, the method can be characterized in that the determination that a non-propulsion state exists can be performed when the work-performing machine is at a standstill. Additionally, the determination that a non-propulsion state exists can be performed when the detected operating mode of the electric machine corresponds to a torque-free mode. Additionally, according to an embodiment, the driving request must correspond to a target standstill of the work-performing machine. Here, the target standstill of the work-performing machine can be determined in dependence on the detected driving request of the driver. For example, the driving request can correspond to the target standstill of the work-performing machine if no pedal is being pressed by the driver, i.e., if there is no driving request.

A determination, implemented in this way, of whether the non-propulsion state is present can ensure that both the actual movement of the work-performing machine corresponds to a standstill and the operating mode of the electric machine corresponds to a torque-free mode. In other words, the operating mode corresponds to a state in which the electric machine is not configured to contribute to the propulsion of the work-performing machine. In addition, this non-propulsion state is also present only when the driver also does not want to start, characterized by the driving request.

According to an embodiment, the method can be characterized in that the determination that the non-propulsion state is present is made only when the detected driving request corresponds to the target standstill of the work-performing machine. Thus, a non-propulsion state does not exist if the driving request does not correspond to the target standstill of the work-performing machine. For example, the driving request does not correspond to the target standstill of the work-performing machine when the driver presses an accelerator pedal of the work-performing machine.

This means that the active monitoring can be reset by the driver. This resetting of the active monitoring can be effected, for example, by pressing the accelerator pedal. The function implemented by the method can thus be made more robust by not determining the safety-critical state when the driver presses an accelerator pedal. Then, there can no longer be an unintentional start, since the driver expresses a desire to start by pressing the accelerator pedal. Alternatively, the monitoring can also be reset when the driver has not yet pressed the accelerator pedal, but the actual movement of the work-performing machine changes and no longer corresponds to standstill. However, this can only be done if, at the same time, no fault is detected, i.e., the operating mode of the electric machine does not correspond to the motor mode, or does not change to the motor mode.

A second aspect of the invention relates to a control device configured to execute a method for controlling a work-performing machine according to an embodiment of the first aspect of the invention. Here, the control of the work-performing machine may comprise prevention of an unintentional start of the work-performing machine. The control device can comprise interfaces for receiving and transmitting signals from and to sensors, actuators and further control devices. The control device can be configured to determine a travel strategy for the work-performing machine in dependence on a driving command, which can comprise the travel direction request and alternatively or additionally a driving request, and to control the electric machine with a target torque.

A third aspect of the invention relates to a drive assembly comprising an electric machine and a control device according to the second aspect of the present invention. The electric machine can comprise a low-voltage inverter. A current torque at the electric machine can be determinable only to a limited extent by the low-voltage inverter, and information relating to the torque at the electric machine can be sent from the low-voltage inverter to the control device in the form of information relating to the operating mode. Furthermore, information relating to the motor speed at the electric machine can be sent from the low-voltage inverter to the control device. The low-voltage inverter can be configured, after sending the signal for transferring the electric machine into a state not suitable for propulsion, to transfer the electric machine into a torque-free state. This signal can be sent here by the control device.

A fourth aspect of the present invention relates to a work-performing machine comprising a vehicle control device, a travel direction switch, at least one pedal, for example a brake pedal and an accelerator pedal, and a drive assembly according to the third aspect of the present invention. The at least one pedal and alternatively or additionally the travel direction switch can be electrically and electronically connected to the vehicle control device, which in turn can be electrically and electronically connected to the drive assembly, and in so doing to the control device of the drive assembly. Signals from the at least one pedal and alternatively or additionally from the travel direction switch can be sent to the control device via the vehicle control device. In the control device, steps of the method for preventing an unintentional start of the work-performing machine can be executed. Further, the work-performing machine can be configured to transfer the electric machine to a state not suitable for propulsion. The work-performing machine can be configured according to a disclosure above.

DETAILED DESCRIPTION OF EMBODIMENTS

Figure 2:
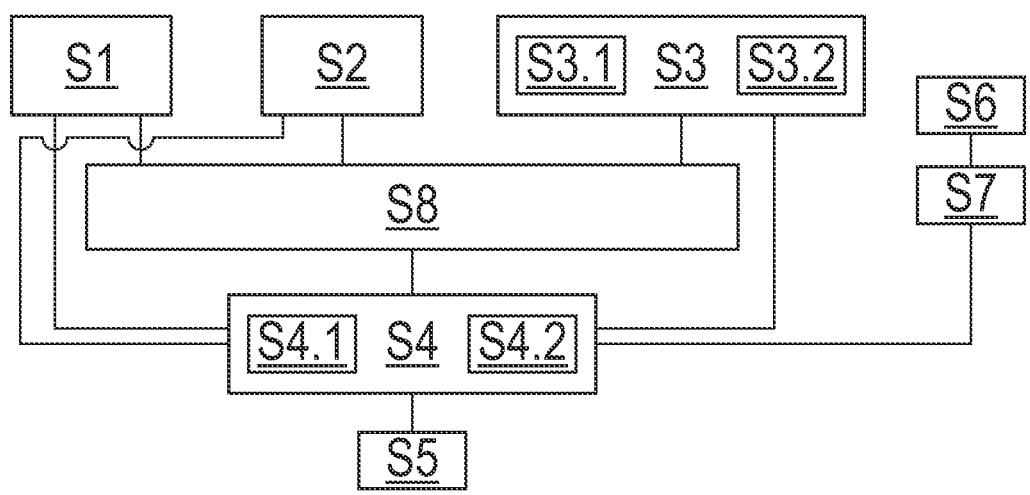
FIG. 2 schematically shows steps of a method for preventing an unintentional start of a work-performing machine according to FIG. 1.

FIG. 1 schematically shows a work-performing machine 14 according to an embodiment of the present invention. The work-performing machine 14 has a drive assembly 6 of an embodiment of the present invention. The drive assembly 6 has a control device 4 of an embodiment of the present invention, as well as an electric machine 2, which has a low-voltage inverter. The electric machine 2 is electrically and electronically connected to the control device 4 via the low-voltage inverter. Furthermore, the work-performing machine 14 comprises a vehicle control device 8 electrically and electronically connected to the control device 4. The vehicle control device 8 is electrically and electronically connected to a pedal 10 and to a travel direction switch 12. The vehicle control device 8 is configured to receive, process and transmit signals from the pedal 10 and from the travel direction switch 12 to the control device 4. The electric machine 2 and the low-voltage inverter are configured to send electrical signals to the control device 4. The control device 4 is configured to execute a method for preventing unintentional driving of the work-performing machine 14 according to the steps schematically shown in FIG. 2. Further, the control device 4 is configured to send signals to the electric machine 2 and the low-voltage inverter.

Figure 3A:
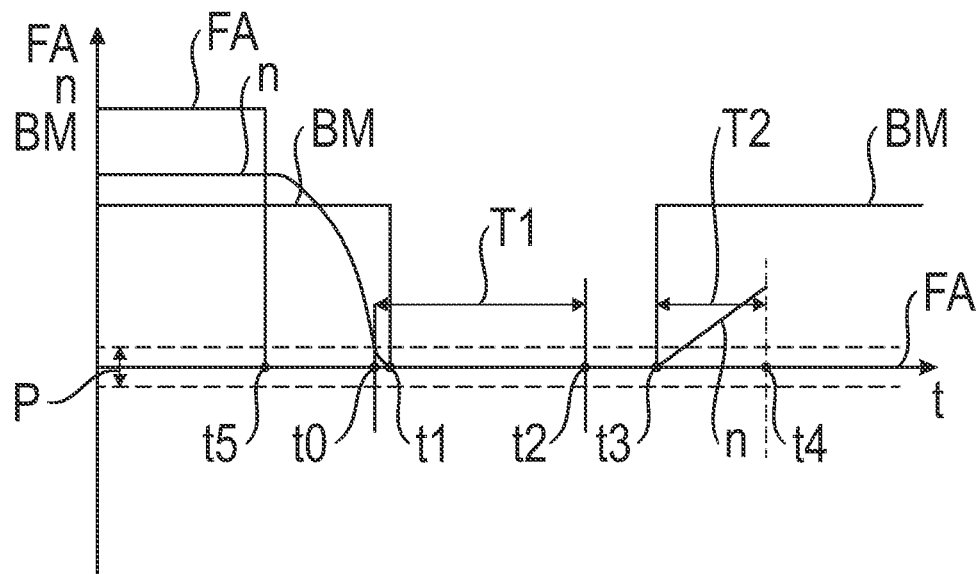
FIG. 3a and FIG. 3b each schematically show time profiles of state variables during execution of the method with the steps shown schematically in FIG. 2.
Figure 3B:
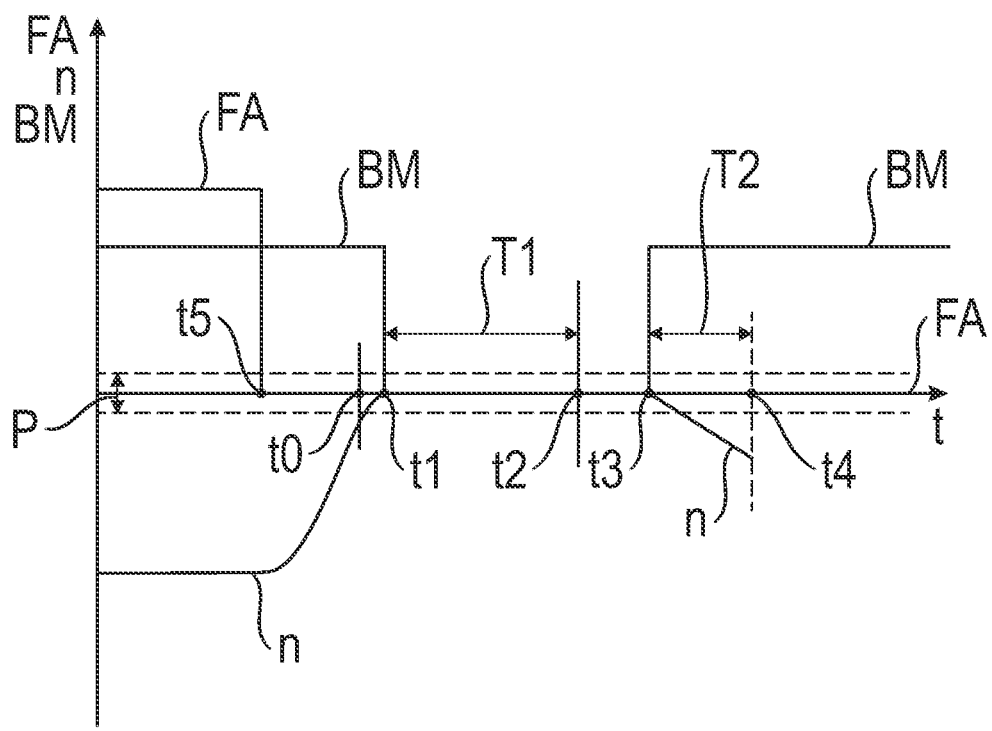

FIGS. 3a and 3b each schematically show time profiles of state variables during execution of the method for preventing an unintentional start of the work-performing machine 14. Here, driving request FA, motor speed n and operating mode BM are shown as state variables against time t. FIG. 3a shows a case here in which the work-performing machine 14 moves forward at an initial point in time, as indicated by the positive motor speed n. FIG. 3b shows a case in which the work-performing machine 14 moves backwards at an initial point in time. In the following, the method is described in relation to the case shown in FIG. 3a, with only differences from the case shown in FIG. 3b being discussed.

Initially, a change of the driving request FA from a non-zero value to a value equal to zero occurs at a time t5. In the embodiment shown, the driver of the work-performing machine 14 first depresses the pedal 10, for example an accelerator pedal of the work-performing machine 14. The driving request FA is not zero. Then, at time t5, the driver stops depressing the pedal, with the driving request changing to a value equal to zero. A check S1 is performed to determine whether a driving request FA exists. From time t5, there is no longer a driving request FA.

Furthermore, information is detected S2 relating to the operating mode BM of the work-performing machine 14 and the electric machine 2. At a time t1, the operating mode BM of the electric machine 2 changes from motor mode to torque-free mode. From time t1 onwards, therefore, no relevant torque is transmitted from the electric machine 2 to a driven wheel of the work-performing machine 14 for propulsion of the work-performing machine 14.

After the pedal 10 is released, represented by the driving request FA, deceleration of the work-performing machine 14 occurs. This is represented by a changed motor speed n, which is detected in a step of a detection S3. This also includes a determination S3.1 of an actual movement of the work-performing machine 14 based on the detected motor speed n. The actual movement in the case shown in FIG. 3a corresponds to forward travel of the work-performing machine 14, while in the case shown in FIG. 3b it corresponds to reverse travel. The motor speed n decreases in magnitude between times t5 and t1 to a value equal to zero. From an amount of the motor speed n equal to a value which is within a parameter range P, there is a standstill of the work-performing machine 14. This standstill is present from time t0.

At the time t0, therefore, there is neither a driving request FA, which corresponds to a target standstill of the work-performing machine 14, nor is the work-performing machine 14 moving, since a standstill has been detected according to the motor speed n. Furthermore, from the time t1, the electric machine 2 is in an operating mode BM, which corresponds to a torque-free mode. Since all these preconditions are present from time t1, a non-propulsion state of the work-performing machine 14 is present as of then, which is determined by a determination S8. Then, a debounce time T1 starts to run. If the preconditions for the non-propulsion state are present during the entire debounce time T1, monitoring is switched active at a time t2 by determining S4.2 whether the non-propulsion state is present for the debounce time T1. The monitoring is carried out by the method.

At a time t3, the operating mode BM of the electric machine 2 changes to motor mode. Then, a fault tolerance time T2 starts to run. At a time t4, the fault tolerance time T2 has expired and a determination S4.1 is made as to whether the safety-critical state exists for the duration of the fault tolerance time T2. If the operating mode BM is still in motor mode, a safety-critical state is determined in the step of a determination S4.

Furthermore, a gradient of the motor speed n is determined S3.2. This is shown schematically in FIGS. 3a and 3b by a linearly increasing motor speed n from time t3. In the determination S4, the safety-critical state is determined only if the gradient of the motor speed n is greater than a minimum gradient. Thus, in the case of creeping driving, it is excluded that a safety-critical state is determined.

In a step S6, a driver's travel direction request is detected. A position of a travel direction switch 12 is determined. The error tolerance time T2 is determined in step S7 in dependence on the detected travel direction request, which can be forward, reverse or neutral. This determined error tolerance time T2 is used in the step of determining S4 the safety-critical state.

Furthermore, if a safety-critical state exists, a signal S5 is sent to the electric machine 2, and in this case to the low-voltage inverter, for transferring the electric machine 2 into a state not suitable for propulsion. This state not suitable for propulsion is achieved by sending a safety state request from the control device 4 to the inverter and further to the electric machine 2. After the electric machine 2 has been transferred into a state not suitable for propulsion, the electric machine 2 is torque-free with respect to the propulsion of the work-performing machine 14. Thus, there is no power transfer from the electric machine 2 for propulsion of the work-performing machine 14.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS 2 electric machine
4 control device
6 drive assembly
8 vehicle control device
10 pedal
12 travel direction switch
14 work-performing machine
S1 (step) check whether there is a driving request from a driver
S2 (step) detect information relating to an operating mode
S3 (step) detect a state variable of the work-performing machine
S3.1 (step) determine an actual movement of the work-performing machine
S3.2 (step) determine a gradient of the motor speed
S4 (step) determine a safety-critical state
S4.1 (step) determine whether a safety-critical state exists for fault tolerance time
S4.2 (step) determine whether non-propulsion state is present for debounce time
S5 (step) send a signal to the electric machine
S6 (step) detect a travel direction request from the driver
S7 (step) determine an error tolerance time
S8 (step) determine whether non-propulsion state is present.
BM operating mode
FA driver request
n motor speed
P parameter range
T1 debounce time
T2 error tolerance time
t time
t0 (time) standstill detected
t1 (time) start debounce time
t2 (time) end of debounce time
t3 (time) start of error tolerance time
t4 (time) end of error tolerance time
t5 (time) change of driving request

The invention claimed is:

1. A method for preventing an unintentional start of a work-performing machine, wherein the work-performing machine comprises an electric machine for propelling the work-performing machine, the method comprising:
  checking whether there is a driving request from a driver of the work-performing machine;
  detecting information relating to an operating mode of the electric machine;
  determining, based on the checking in relation to the driving request and the detected operating mode of the electric machine, whether the electric machine is in a safety-critical state, wherein the determination of the safety-critical state comprises a determination of whether the safety-critical state is present for the duration of a fault tolerance time;

detecting a driver's travel direction request, wherein the fault tolerance time is determined in dependence on the detected travel direction request; and preventing the unintentional start of the work-performing machine, wherein the unintentional start of the work-performing machine is prevented by sending a signal to the work-performing machine to transition the work-performing machine to a state not suitable for propulsion, based on determining that the electric machine is in the safety-critical state.

2. The method as claimed in claim 1, wherein the safety-critical state is determined when the electric machine is in a motor mode.

3. The method as claimed in claim 1, comprising detecting a state variable of the work-performing machine correlating with an actual movement of the work-performing machine, the detection comprising a determination of an actual movement of the work-performing machine based on the detected state variable, wherein the safety-critical state is determined when the determined actual movement changes from a standstill of the work-performing machine to a locomotion of the work-performing machine.

4. The method as claimed in claim 3, wherein the detection of the state variable correlating with the actual movement of the work-performing machine comprises a detection of a motor speed of the electric machine, and wherein, in the determination of the actual movement of the work-performing machine, a standstill of the work-performing machine is determined if the detected motor speed is within a parameter range around a motor speed corresponding to a standstill of the work-performing machine.

5. The method as claimed in claim 4, wherein a gradient of the detected motor speed is determined, and wherein the safety-critical state is determined if the determined gradient of the detected motor speed is greater than a minimum gradient.

6. The method as claimed in claim 1, comprising determining whether a non-propulsion state is present, wherein, in the non-propulsion state, no propulsion of the work-performing machine takes place, and wherein the safety-critical state is determined when it has been determined that a non-propulsion state is present.

7. The method as claimed in claim 6, wherein the determination of the safety-critical state comprises determining whether the non-propulsion state exists for at least a debounce time.

8. The method as claimed in claim 6, wherein the determination that the non-propulsion state exists is performed when the work-performing machine is at a standstill, wherein the detected operating mode of the electric machine corresponds to a torque-free mode, and wherein the driving request corresponds to a target standstill of the work-performing machine.

9. The method as claimed in claim 8, wherein the determination that the non-propulsion state is present is made only when the driving request corresponds to the target standstill of the work-performing machine.

10. A control device, which is configured to execute the method for controlling a work-performing machine as claimed in claim 1.

11. A drive assembly comprising an electric machine and the control device as claimed in claim 10.

12. A work-performing machine comprising a vehicle control device, a pedal, a travel direction switch and the drive assembly as claimed in claim 11.

* * * * *